United States Patent
Kagami et al.

(10) Patent No.: US 6,324,132 B1
(45) Date of Patent: Nov. 27, 2001

(54) METHOD AND SYSTEM FOR CONTROLLING THE POSITIONING OF A READ/WRITE HEAD OF A DATA RECORDING DEVICE

(75) Inventors: Naoyuki Kagami; Akira Tokizono, both of Fujisawa; Hiroshi Uchida, Sagamihara, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,699

(22) Filed: Oct. 28, 1999

(30) Foreign Application Priority Data

Oct. 29, 1998 (JP) .................................................. 10-309174

(51) Int. Cl.[7] .................................................. G11B 17/22
(52) U.S. Cl. .......................................... 369/32; 360/78.04
(58) Field of Search ................................. 369/32, 44.28, 369/44.27, 44.29, 44.35; 360/75, 77.04, 77.02, 78.04, 78.07, 78.01

(56) References Cited

U.S. PATENT DOCUMENTS

| | | | |
|---|---|---|---|
| 4,135,217 | * | 1/1979 | Jacques et al. ................... 360/77.04 |
| 4,969,059 | * | 11/1990 | Volz et al. ........................ 360/78.04 |
| 5,105,318 | * | 4/1992 | Tsuneta et al. ................... 360/77.01 |
| 5,146,440 | * | 9/1992 | Yamaguchi et al. ................ 369/32 |
| 5,150,266 | * | 9/1992 | Albert ............................... 360/78.04 |
| 5,608,588 | * | 3/1997 | Kisaka .............................. 360/78.04 |

FOREIGN PATENT DOCUMENTS

| | | | | |
|---|---|---|---|---|
| 798 698 A2 | * | 1/1997 | (EP) | ........................................ 369/32 |
| 4-170774 | * | 6/1992 | (JP) | ........................................ 369/32 |
| 5-54571 | * | 3/1993 | (JP) | ........................................ 369/32 |
| 8-36849 | * | 2/1996 | (JP) | ........................................ 369/32 |

* cited by examiner

Primary Examiner—Tan Dinh
(74) Attorney, Agent, or Firm—Randall J. Bluestone; Bracewell & Patterson, L.L.P.

(57) ABSTRACT

A read/write head servo control system for data recording devices, wherein a method of compensating initial values is utilized to generate a control signal to move the head from an initial position to a target position. The method estimates and stores multiple position compensation values. A first control signal moves the head from an initial position to a target position. Head position values are sampled as the head moves. Head position deviation values are calculated for the sampled position values. The head position values are utilized to select a set of estimated position compensation values. These values are in turn utilized to generate a second control signal, which is then utilized to control the position of the head.

20 Claims, 13 Drawing Sheets

METHOD AND SYSTEM FOR CONTROLLING THE POSITIONING OF A READ/WRITE HEAD OF A DATA RECORDING DEVICE

BACKGROUND OF THE INVENTION

1. Technical Field

The present invention relates to a data recording device, and, in particular, to an improved method and system for controlling the movement of a read/write head of a data recording device. Still more particularly, the present invention relates to an improved method and system for controlling the movement of a read/write head of a data recording device, wherein an initial value compensation method is selectable for determining a control signal for controlling the movement of the read/write head.

2. Description of the Related Art

A data recording device, such as a hard disk drive device or an opticalmagnetic disk drive device, is utilized for writing the data in a data recording track and reading data from the data recording track. For a hard disk drive device, one end of the arm is pivotally supported on a frame of the hard disk drive device, and the read/write head is mounted on the other end of the arm. The arm is moved to a target data recording track along the radius direction of a magnetic recording disk by an actuator to perform the read/write operation.

A control scheme has been implemented which shortens a time period for moving the read/write head from a current position or a start position to a target position or a target track position and precisely positions the read/write head on the target track to improve performance of the hard disk drive device. To this end, a control scheme has been utilized, which utilizes a combination of multiple operation modes during a positioning period for moving the read/write head from the start position to the target track position.

With reference to FIG. 1, there is depicted a timing diagram representing operation of the positioning period for moving the read/write head from the start position to the target position. A curve 1 illustrates a trace of the read/write head moved in this control scheme. A curve 2 depicts a trace of the read/write head moved in the case that the IVC method, later described, is utilized.

A selective combination of a seek mode operation, a settling mode operation and a following mode operation is utilized in the positioning period in accordance with a distance between the start position of the read/write head and the position of the target track. In particular, in the case that the distance between the start position and the target position is long, the seek mode operation, the settling mode operation and the following mode operation are performed.

In the seek mode operation, a target speed of the read/write head, in accordance with the distance between the start position and the target position, is selected. In addition, a speed control for bringing the speed of the read/write head to the target speed is performed. When a position/speed control device detects at a sampling time "n6" that the read/write head has reached a position which is separated from the target position by a predetermined distance L1, i.e. a predetermined number of remaining tracks, the position/speed control device switches the operation mode from the seek mode to the settling mode.

In the settling mode, the moving speed of the read/write head is increased and decreased. When the position/speed control device detects at a sampling time "n15" that the read/write head reaches a position which is separated from the target position by a predetermined distance L2, the position/speed control device switches the operation mode from the settling mode to the following mode.

In the following mode, the moving speed of the read/write head is increased and decreased to position the read/write head on the target track. Further, after the following mode, the position/speed control device performs an operation mode for maintaining the read/write head on the target track.

Referring now to FIG. 2, there is illustrated a block diagram of a feedback loop of the position/speed control device and a mechanical system, i.e. the actuator and the arm, in the case that an initial value compensation (IVC) method is not utilized. State variables $Xp(n)$ of the mechanical system at the "nth" sampling time are depicted in FIG. 2. In particular, since an effect of higher terms such as $y(n-2), \ldots, U(n-3)$ is small, these are omitted.

$$\begin{bmatrix} y(n) \\ (y(n) - y(n-1)) \\ U(n-1) \\ U(n-2) \\ \ldots \end{bmatrix}$$

The sampling times in the case that the IVC method is utilized are depicted in FIG. 1. At each of the sampling times, the start position of the read/write head is detected. The "$y(n)$" represents a positional deviation signal=(the current position of the read/write head—the target position) at the sampling time "n". Usually, the target position is represented by "0". For example, if the read/write head is positioned at a position separated from the target position by 300 tracks, the value of $y(n)$ is 300, in other words, the value of the positional deviation signal is 300. "$Y(n-1)$" represents the positional deviation signal at the sampling time "n-1". "$U(n-1)$" represents the output signal of the position/speed control device generated at the sampling time "n-1". This output signal is stored in the position/speed control device. "$U(n-2)$" represents the output signal of the position/speed control device generated at the sampling time "n-2". This output signal is also stored in the position/speed control device.

The position/speed control device generates the output signal $U(n)=kXc(n)$ at each of the sampling times, and supplies the output signals to the actuator, i.e. a voice coil motor, as depicted in FIG. 2. A value "k" is a vector, and the value of "k" is changed in accordance with the operation mode. More particularly, a vector "km" is utilized in the seek mode, a vector "ks" is utilized in the settling mode, and a vector "kf" is utilized in the following mode, the operation of each operation mode is controlled by the value of "k". It is noted that the state variables $Xp(n)$ of the mechanical system, i.e. the actuator and the arm, are substantially equal to the state variables $Xc(n)$ which are utilized by the position/speed control device, as illustrated in FIG. 2. Although $Xp(n)$ is not actually equal to $Xc(n)$ since $Xp(n)$ includes higher terms, it can be considered in controlling the mechanical system of the hard disk drive device that $Xp(n)=Xc(n)$.

The operation for switching the operation mode from one mode to another mode is a discontinuous operation. More particularly, even if each of the operation modes is optimized, an entire positioning operation including the combination of these operation modes does not become an optimized operation. To solve this problem, an initial value compensation (IVC) method has been proposed. As described, curve 2 in FIG. 1 illustrates the trace of the read/write head moved in the IVC. Along curve 2, the state at the time point or the sampling time "n0" at which the operation mode is switched from one operation mode, such as the seek mode, to the succeeding operation mode, such as the settling mode, is treated as the initial state of the settling mode. At the switching time "n0", the state variables or parameters utilized by the position/velocity control device for controlling the settling mode are set to new state variables $Xc(0)'=KXp(0)=KXc(0)$, wherein K is a matrix.

Various proposals for calculating the new state variables $Xc(0)'=KXp(0)=KXc(0)$ have been made. For example, in U.S. Pat. No. 5,164,931, $Xp(0)$ is calculated by utilizing the distance to the target track and the speed as the state variables. In U.S. Pat. No. 5,561,568, $Xp(0)$ is calculated by utilizing position signals of the read/write head, $P(0)$, $P(-1)$, . . . , and signals $U(-1)$, $U(-2)$, . . . , to the actuator/arm as the state variables. By the IVC method in these patents, the new state variables $Xc(0)'=KXp(0)$ are calculated only at the transition from the switching time to the settling mode, and the output signals required in the settling mode are generated based upon the new initial value. In the settling mode utilizing the IVC method, a rapid acceleration or speed up, and a rapid deceleration or speed down of the read/write head are performed in comparison with the case without utilizing the IVC method, so that the time period for positioning the read/write head can be shortened, as depicted in FIG. 1.

Although the time period for positioning the read/write head to the target track can be shortened by utilizing the IVC method, the following problems typically arise. A first problem is that, in the case that the rapid speed up and the rapid speed down of the read/write head are required at the switching time from the seek mode to the settling mode, the position/speed control device generates a pulse output signal of a large amplitude including high frequency components. Thereby, the length of the settling period is extended due to the high frequency components of the pulse output signal. More particularly, the high frequency components cause the mechanical vibration of the actuator, the arm and the read/write head to generate, and the length of the time period for completing the settling mode is extended due to the mechanical vibration. In other words, the use of the IVC method extends the time period of the settling mode, so that the total time period for positioning the read/write head is extended in comparison with the settling mode without utilizing the IVC method.

A second problem is that, in the case that the IVC method is utilized, a time period for calculating new state variables $Xc(0)'=KXp(0)$ is required at the switching time from the seek mode to the settling mode, and the generation of the control signal of the settling mode is delayed by this calculation time period. To solve this problem, in IBM Technical Disclosure Bulletin, Vol.39, No.11, November 1996, p.p.95–98, a value of $Xc(0)'$ corresponding to a moving distance of the read/write head and the output $U(0)$ of the control device at the switching time are stored in a table. In the case of the hard disk drive device with the disk having more than 10,000 data tracks, a vast table is required to store the data, so that this scheme can not be utilized in practical products.

Therefore, in view of the foregoing, it is desirable to provide a data recording device and method for controlling the data recording device which solves the various problems caused in the case of utilizing the IVC method.

SUMMARY OF THE INVENTION

In view of the foregoing, it is therefore an object of the present invention to provide an improved data recording device.

It is another object of the present invention to provide an improved method and system for controlling the movement of a read/write head of a data recording device.

It is yet another object of the present invention to provide an improved method and system for controlling the movement of a read/write head of a data recording device, wherein an initial value compensation method is selectable for determining a control signal for controlling the movement of the read/write head.

In accordance with the method and system of the present invention, a read/write head servo control system for data recording devices is provided, wherein a method of compensating initial values is utilized to generate a control signal to move the head from an initial position to a target position. The method estimates and stores multiple position compensation values. A first control signal moves the head from an initial position to a target position. Head position values are sampled as the head moves. Head position deviation values are calculated for the sampled position values. The head position values are utilized to select a set of estimated position compensation values. These values are in turn utilized to generate a second control signal, which is then utilized to control the position of the head.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
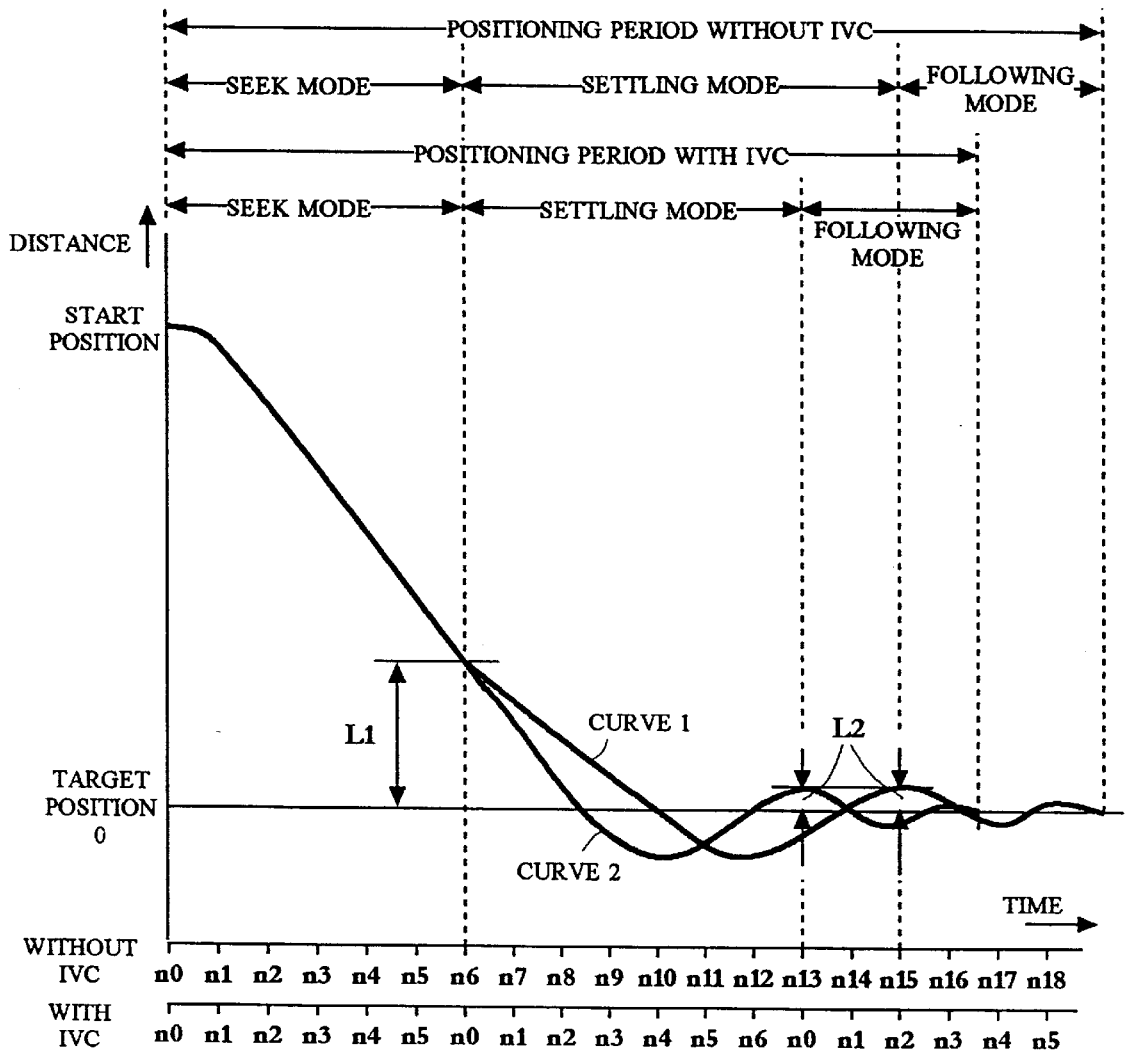
FIG. 1 depicts a timing diagram representing operation of the positioning period for moving the read/write head from the start position to the target position.
Figure 2:
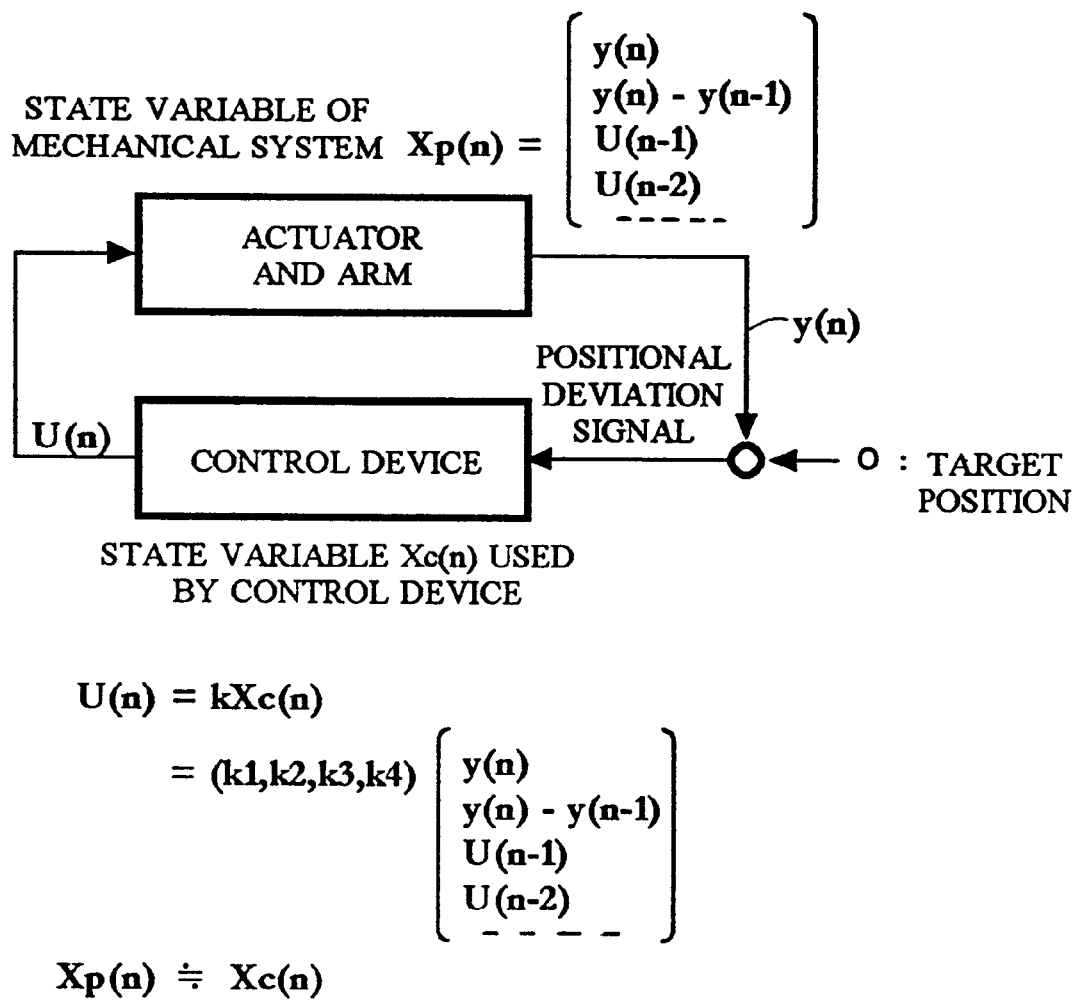
FIG. 2 illustrates a block diagram of a feedback loop of the position/speed control device and a mechanical system, i.e. the actuator and the arm, in the case that the IVC method is not utilized.
Figure 3:
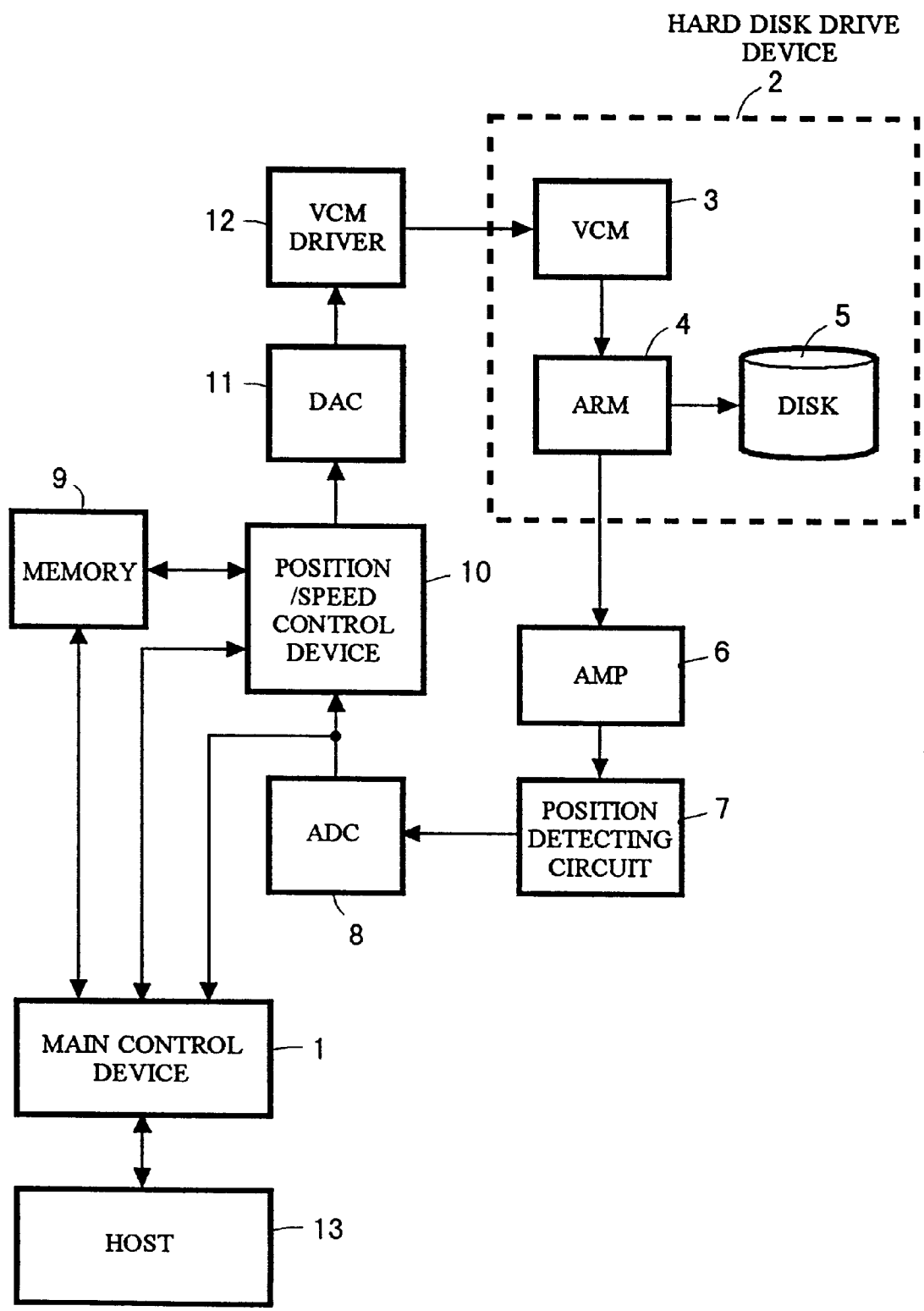
FIG. 3 depicts a block diagram of a hard disk drive device and a control system for controlling the hard disk drive device.

With reference now to the figures and in particular with reference now to FIG. 3, there is depicted a block diagram of a hard disk drive device and a control system for controlling the hard disk drive device. A hard disk drive device 2 and a control system for controlling device 2 are depicted. Magnetic hard disk drive device 2 includes a data recording medium such as a hard disk 5 rotated by a spindle motor(not shown), an arm 4 which supports the read/write head (called the head, hereinafter) for writing the data into the magnetic data recording track of hard disk 5 and for reading the data from the track, and a positioning device or voice coil motor (VCM) 3 for moving the arm along a radial direction of hard disk 5. An amplifier 6 amplifies the servo data signals read by the head. A position detecting circuit 7 receives the output signals of amplifier 6, and detects the current position of the head to supply an analog signal representing the position of the head to an analog digital converter (ADC) 8.

ADC 8 converts the analog signal to a digital signal to supply it to position/speed control device 10. Position/speed control device 10 generates the digital signal for accelerating or decelerating arm 4 to supply it to an analog digital converter (DAC) 11. DAC 11 converts the digital signal to the analog signal to supply it to a VCM driver 12. VCM driver 12 supplies the control signal to VCM 3.

A main control device 1 receives the signal representing the operation mode, such as a write mode or a read mode, the write data, the target track position, etc. from a host 13 and sends a signal for controlling position/speed control device 10. Host 13 may comprise, for example, a CPU of a computer system. A memory 9 is connected to the main control device 1 and position/speed control device 10 for storing the data required for the control operation.

Operation of a First Embodiment of the Invention

Figure 4:
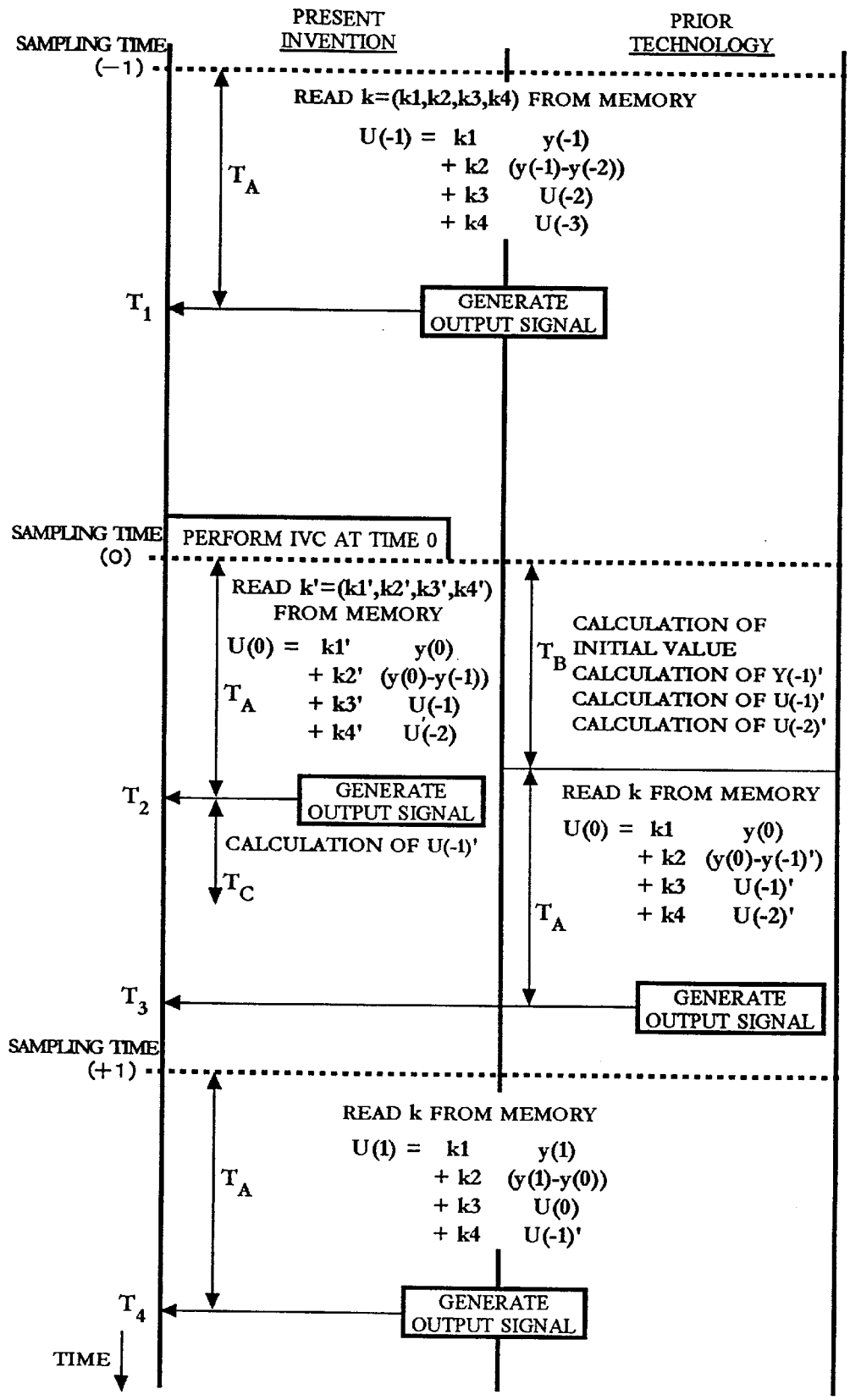
FIG. 4 illustrates a timing diagram of the operations of the present invention and the prior technology at the switching time of the operation mode, such as the switching time from the seek mode to the settling mode.

With reference now to FIG. 4, there is illustrated a timing diagram of the operations of the present invention and the prior technology at the switching time of the operation mode, such as the switching time from the seek mode to the settling mode. In particular, FIG. 4 depicts the difference between the operation of the IVC method of the first embodiment of the present invention and operation of the IVC method of the prior art.

A sampling time (0) depicted in FIG. 4 represents the switching time of the operation mode. A sampling time (−1) represents the time just before sampling time (0). Position/speed control device 10 generates the next output signal at each of the sampling times as provided by an equation (1).

$$U(n)=k \cdot Xc(n) \tag{1}$$

The operation of the present invention at sampling time (−1) is the same as that of the prior technology. At sampling time (−1), position/speed control device 10 performs the calculation of an equation (2) and generates an output signal U(−1) represented by equation (2). This output signal is supplied to VCM 3 through DAC 11 and VCM driver 12. For the present embodiment, k=(k1, k2, k3, k4) and position/speed control device 10 reads the value k from the memory 9 at sampling time (−1). The time period required for the calculation is a time $T_A$, and the output signal is generated at a time $T_1$.

$$U(-1)=k \cdot Xc(-1) \tag{2}$$

The IVC is performed at the sampling time (0). First, the operation of the IVC method of the prior technology will be described. By the method of the prior technology, the new initial value Xc(0)' is calculated in accordance an equation (3), wherein K is a matrix. Xc(0)' is represented by an equation (4).

$$Xc(0)'=K \cdot Xp(0) \tag{3}$$

$$\begin{bmatrix} y(o) \\ (y(o)-y(-1)') \\ U(-1)' \\ U(-2)' \end{bmatrix} \tag{4}$$

Accordingly, position/speed control device 10 calculates the values of y(−1)', U(−1)' and U(−2)' at sampling time (0). A time period $T_B$ is required to calculate these three values. Thereafter, position/speed control device 10 generates the output signal by utilizing an equation (5).

$$U(0)=k \cdot Xc(0)' \tag{5}$$

The time for calculating equation (5) is time period $T_A$, and hence the output signal for sampling time (0) by the prior technology is generated at time $T_3$. In this manner, the prior technology requires time period $T_B$ for calculating the initial values, so that the problem in the prior technology is that the generation of the output signal for sampling time (0) is delayed due to time period $T_B$.

With reference still to FIG. 4 and the prior technology, the output signal for sampling time (+1) is calculated in accordance with an equation (6). Position/speed control device 10 reads the value of k from memory 9, and generates the output signal in accordance with equation (6).

$$U(1) = \begin{matrix} k1 & y(1) \\ +k2 & (y(1)-y(0)) \\ +k3 & U(0) \\ +k4 & U(-1)' \end{matrix} \tag{6}$$

Switching methods, by the first embodiment of the present invention, the combination of the calculation of the equation (3) and equation (5) is performed in a new manner. Describing the calculation scheme of the present invention, the above equation (5) is represented by an equation (7).

$$U(0)=k \cdot Xc(0)'=k \cdot K \cdot Xp(0)=k' \cdot Xp(0) \tag{7}$$

In equation (7), the product of the vector k, i.e. the coefficient utilized by position/speed control device 10, and the matrix K are represented as a coefficient vector k'=(k1', k2', k3', k4'). That is, k'=k·K. The vector k is an independent value from the IVC, and is a predetermined value stored in memory 9. Although Xp(n) is not actually equal to Xc(n) since Xp(n) includes higher terms, it can be considered in controlling the mechanical system of the hard disk drive device that Xp(n)=Xc(n), as described before. That is, equation (7) is represented by an equation (8).

$$U(0)=k' \cdot Xc(0) \tag{8}$$

That is, $$U(0) = \begin{matrix} k1' & y(0) \\ +k2' & (y(0)-y(-1)) \\ +k3' & U(-1) \\ +k4' & U(-2) \end{matrix}$$

The value of the vector k' is preferably calculated in advance, and can be stored in memory 9. Since y(0) in Xc(0) is the position of the read/write head at sampling time (0), y(−1) in Xc(0) is the position of the read/write head at sampling time (−1), U(−1) in Xc(0) is the output signal of control device 10 at sampling time (−1), and U(−2) in Xc(0) is the output signal of control device 10 at sampling time (−2), the time period required for calculating equation (8) is time period $T_A$, as depicted in FIG. 4.

Accordingly, in the present invention, position/speed control device 10 can apply the output signal to VCM 3 at time $T_2$ which is the time after a lapse of time period $T_A$ from sampling time (0). In the prior technology, this output signal is generated at time $T_3$. In the present invention, the time period between time $T_1$ and time $T_2$ is equal to the sampling period, while the time period between time $T_1$ and time $T_3$ in the prior technology deviates from the sampling period. This deviation disturbs the smooth control of the head. By the present invention, smooth control of the head is achieved.

However, the present invention distinctly requires calculating Xc(0) by an equation (9). More particularly, the state variables utilized by position/speed control device 10 in the calculation of equation (8) are the old state variables Xc(0).

$$Xc(o) = \begin{bmatrix} y(0) \\ (y(0)-y(-1)) \\ U(-1) \\ U(-2) \end{bmatrix} \quad (9)$$

By calculating Xc(0) according to equation (9), state variables Xc(0) of position/speed control device 10 utilized in the calculation for generating the output signal at sampling time (0) are not changed to the new state variables Xc(0)'. If the old state variables Xc(1) of an equation (10) are utilized to generate the output signal for the next sampling time (+1), a different output signal is generated since the old state variables Xc(1) differ from the new state variables Xc(1)' of an equation (11), which must be utilized by position/speed control device 10 to generate the output signal for sampling time (+1).

$$Xc(1) = \begin{bmatrix} y(1) \\ (y(1)-y(o)) \\ U(0) \\ U(-1) \end{bmatrix} \quad (10)$$

$$Xc(1)' = \begin{bmatrix} y(1) \\ (y(1)-y(0)) \\ U(o) \\ U(-1)' \end{bmatrix} \quad (11)$$

In particular, value U(−1) in equation (10) differs from value U(−1)' in equation (11). Accordingly, equation (10) can not be utilized. The value U(−1)' is the value calculated in time period $T_B$ in the prior technology, and only this value remains in state variables Xc(1)'. Accordingly, the position/speed control device 10 of the present invention calculates the value U(−1)' during time period $T_C$ which succeeds time $T_2$, at which the output signal for sampling time (0) is generated, and terminates before time $T_4$, at which the next output signal for sampling time (+1) is generated. Since only the value U(−1)' is calculated in time period $T_C$, position/speed control device 10 can complete this calculation before time $T_4$ at which the next output signal is generated. Position/speed control device 10 replaces U(−1) by U(−1)', which is calculated in time period $T_C$, in time period $T_A$ succeeding to sampling time (+1). Further, position/speed control device 10 utilizes equation (11) in the calculation for generating the output signal for sampling time (+1), wherein U(−1)' is represented by an equation (12). In particular, c1 through c4 are predetermined constant values, and these values are read from memory 9 at the time for reading the value of k' by position/speed control device 10.

$$U(-1)' = \begin{matrix} c1 & y(0) \\ +c2 & (y(0)-y(-1)) \\ +c3 & U(-1) \\ +c4 & U(-2) \end{matrix} \quad (12)$$

Figure 5:
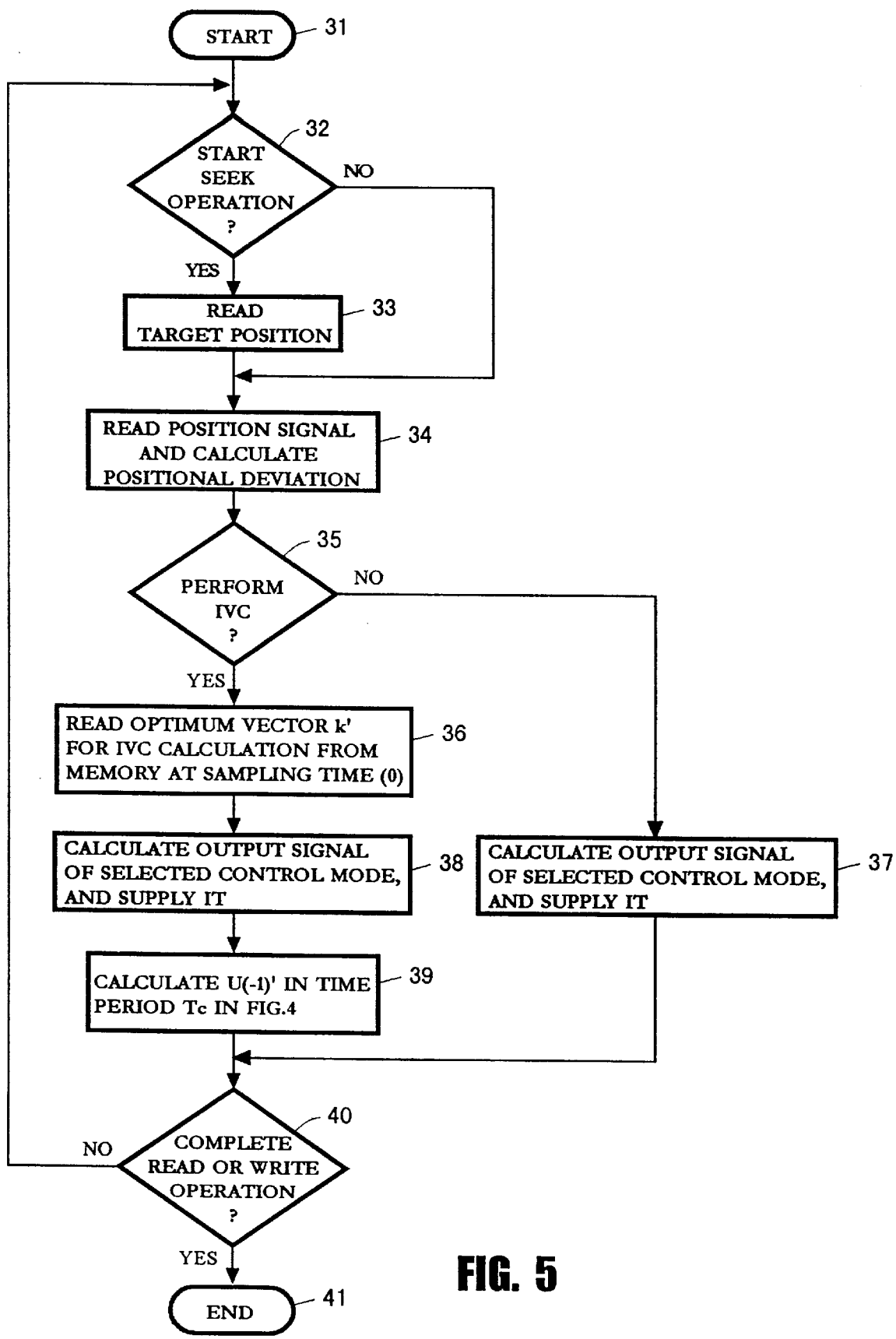
FIG. 5 depicts a high level logic flowchart of the operation of a main control device and position/speed control device.

Referring now to FIG. 5, there is depicted a high level logic flowchart of the operation of a main control device and position/speed control device. In particular, the operation of main control device 1 and position/speed control device 10, may be determined. As illustrated, the process starts in block 31 and thereafter proceeds to block 32. Block 32 depicts a determination as to whether or not to start a seek operation. This determination, in particular is made from whether or not main control device 1 has received a write command or read command, the track position, the data, etc., from host 13. If the seek operation is not to be started, the process passes to block 34. If a seek operation is to be started, the process passes to block 33.

Block 33 illustrates reading the target position. In particular, position/speed control device 10 receives the target position from main control device 1 and stores the target position. Thereafter, block 34 depicts reading the position signal and calculating a positional deviation. In particular, the position speed/control device 10 reads or detects the current position or the start position of the head, and calculates the positional deviation (current position-target position) to store the positional deviation. Preferably, the target position is represented by "0". For example, when the start position of the read/write head is separated from the target position by 300 data tracks and the target position is represented by "0", the value of the positional deviation is 300.

Next, block 35 illustrates a determination as to whether or not to perform IVC. If IVC is not to be performed, the process passes to block 37. Block 37 depicts calculating the output signal of the selected control mode and supplying the output signal. In particular, the output signal is calculated when position/speed control device 10 performs the operation without utilizing the IVC, i.e. the seek mode, the settling mode, the following mode and the mode for keeping the head on the target track. Thereafter the process passes to block 40.

At block 35, if the IVC is to be performed, the process passes to block 36. Block 36 depicts reading the optimum vector k' for IVC calculation from the memory at sampling time (0). Thereafter, block 38 illustrates calculating the output signal of the selected control mode and supplying the output signal. In particular, position/speed control device 10 calculates the output signal required for the control mode to be executed to supply the output signal at the time $T_2$. Next, block 39 depicts calculating $U(-1)'$ in time period $T_C$ as depicted in the FIG. 4. Thereafter, the process passes to block 40.

Block 40 illustrates a determination as to whether or not the read or write operation is completed. In particular, in determining whether or not a read or write operation is completed, position/speed control device 10 determines whether the head is positioned on the target track or the target position and informs main control device 1 of the completion of the operation. If the read or write operation is completed, the process passes to block 41 wherein the process is ended. If the write operation is not completed, the process returns to block 32.

Operation of a Second Embodiment of the Invention

Figure 6:
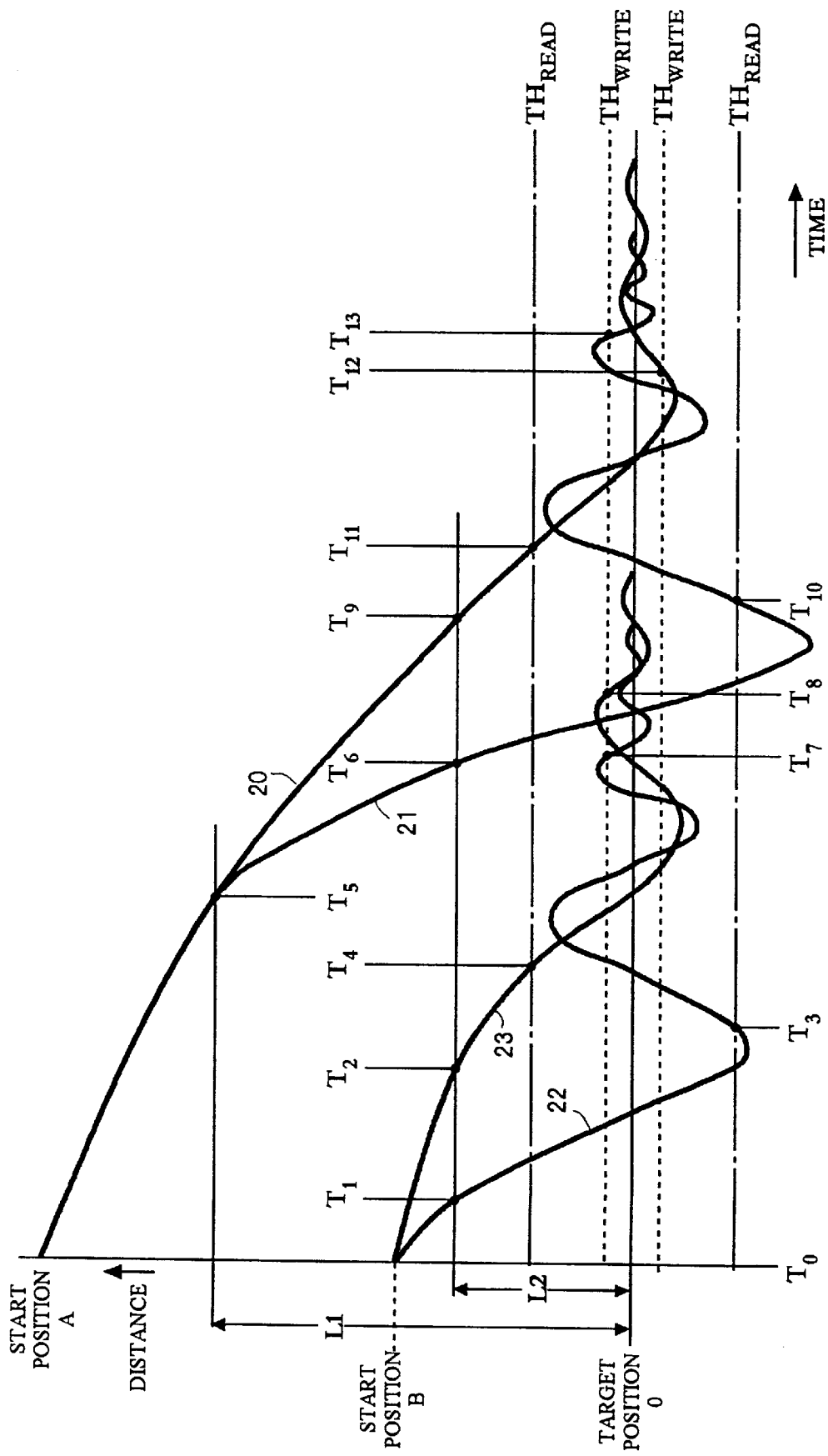
FIG. 6 illustrates a timing diagram of the traces of the head in the case that the IVC is not performed, and traces of the head in the case that the IVC is performed.

With reference now to FIG. 6, there is illustrated a timing diagram of the traces of the head in the case that the IVC is not performed, and traces of the head in the case that the IVC is performed. Traces 20 and 23 depict the head in the case that the IVC is not performed, and the traces 21 and 22 illustrated the head in the case that the IVC is performed. The description of FIG. 6 is directed to the time for starting the read operation and the time for starting the write operation in the case that the start position of the head is at a position A which is separated from the target position by a long distance, such as a distance corresponding to 140 data tracks. In addition, the description is directed to the case that the start position of the head is at a position B which is separated from the target position by a short distance, such as a distance corresponding to 30 data tracks.

Position A

In the case of the start position of the head at a position A, the target position is treated as the position "0", as described before. A length L1 and a length L2 are the predetermined distance. For example, length L1 is selected to a length equal to a distance corresponding to 120 data tracks, and length L2 is selected to a length equal to a distance corresponding to 4 data tracks. When the head reaches the position separated from the target position by length L1, the control mode is switched from the seek mode for controlling the speed of the head to the settling mode for controlling the position of the head. Next, when the head reaches the position separated from the target position by length L2, the control mode is switched from the settling mode to the following mode for following the head to the target track. When positional deviation L, i.e. the difference between the start position A of the head and the target position, is larger than distance L1, the seek mode, the settling mode and the following mode are performed. In the case of L1≧L>L2, the settling mode and the following mode are performed. In the case of L≦L2, the following mode is performed.

Describing the trace of the head when the IVC is not performed with reference to curve 20 shown in FIG. 6, the seek mode is started at time $T_0$, and the control operation for increasing the speed of the head to an optimum speed in accordance with positional deviation L is performed, so that the head is moved from the current position toward the target position.

When position/speed control device 10 detects, at time $T_5$, that the head has reached the position separated from the target position by distance L1, position/speed control device 10 switches the control mode from the seek mode to the settling mode, so that the operation for controlling the position of the head is started.

When position/speed control device 10 detects, at the time $T_9$, that the head has reached the position separated from the target position by the distance L2, position/speed control device 10 switches the control mode from the settling mode to the following mode, so that the following mode operation is started. Two threshold values $TH_{READ}$ and $TH_{WRITE}$ are utilized in the following mode. $TH_{READ}$ represents the position separated from the target position by a predetermined distance, such as a distance corresponding to ⅕ track, and $TH_{WRITE}$ represents the position separated from the target position by a predetermined distance, such as a distance corresponding to ⅒ track. It is preferable to utilize the two threshold values because the degree of precision in positioning the head in the write mode must be higher than the degree of precision of positioning the head in the read mode. Hence a deviation distance of the head from the center of the target track in the write mode must be smaller than a deviation distance of the head from the center of the target track in the read mode. When the head reaches $TH_{READ}$ in the read mode, the read operation for reading the data from the data track is allowed, and when head reaches the $TH_{WRITE}$ in the write mode, the write operation for writing the data into the data track is allowed. Accordingly, in the case of curve 20, the read operation is started at time $T_{11}$ and the write operation is started at time $T_{12}$.

Describing the trace of the head when the IVC is performed with reference to curve 21 depicted in FIG. 6, the seek mode is started at time $T_0$. When the position/speed control device 10 detects at time $T_5$ that the head reaches the position separated from the target position by the distance L1, position/speed control device 10 switches the control mode from the seek mode to the settling mode. In the settling mode in which the IVC is performed, position/speed control device 10 performs the control operation for rapidly accelerating the head and rapidly decelerating the head. When position/speed control device 10 detects at time $T_6$ that the head reaches the position separated from the target position by distance L2, position/speed control device 10 switches the control mode from the settling mode to the following mode, so that the following operation is started.

Due to the rapid acceleration and the rapid deceleration of the head performed in the settling mode, the head vibrates largely around the center of the target track or the target position, as depicted in FIG. 6. The larger the difference between the start position of the head and the target position is, the larger is the distance of the vibration of the head, i.e. the distance of the deviation of the head from the center of the target track. At time $T_{10}$, the read operation is allowed, and at time $T_{13}$, the write operation is allowed. Comparing curve 20 with curve 21, the starting time of the read operation on curve 20 in which the IVC is not performed is $T_{11}$, and the starting time of the write operation is time $T_{12}$, while the starting time of the read operation on curve 21 in which the IVC is performed is $T_{10}$, and the starting time of the write operation is time $T_{13}$.

In this manner, it has been determined that, in the case that the head is started from the position separated from the target track by the long distance, although the time period between time $T_0$ to time $T_{10}$ for allowing the read operation on curve 21 in which the IVC is performed is shorter than the time period between time $T_0$ to time $T_{11}$ for allowing the read operation on curve 20 in which the IVC is not performed, the time period between time $T_0$ to time $T_{13}$ for allowing the write operation on curve 21 in which the IVC is performed is longer than the time period between time $T_0$ to time $T_{12}$ for allowing the write operation on curve 20 in which the IVC is not performed. Also, in this manner, it has been determined, in the case that head is started from the position separated from the target position by the long distance, curve 21 in which the IVC is performed brings the merit of the IVC in the read operation, while curve 21 does not bring the merit of the IVC in the write operation.
Position B Curve 23 illustrates control in which the IVC is not performed is described. At time $T_0$, the settling mode is started. When position/speed control device 10 detects at time $T_2$ that the head has reached the position separated from the target position by the distance L2, position/speed control device 10 switches the control mode from the settling mode to the following mode. At time $T_4$, the read operation is allowed, and at time $T_8$, the write operation is allowed.

Curve 22 depicts control in which the IVC is performed is described. At time $T_0$, the settling mode is started. When position/speed control device 10 detects at time $T_1$ that the head has reached the position separated from the target position by distance L2, position/speed control device 10 switches the control mode from the settling mode to the following mode. In the following mode in which the IVC is performed, position/speed control device 10 rapidly accelerates and rapidly decelerates the head.

Due to the rapid acceleration and the rapid deceleration of the head in the following mode, the head vibrates around the center of the target track or the target position, as depicted in FIG. 6. However, the distance of the deviation of the head from the center of the target track on curve 22 in the case that positional deviation L between the start position of the head and the target position is small, is smaller than the distance of the deviation of the head on curve 21. Accordingly, at time $T_3$, the read operation is allowed, and at time $T_7$, the write operation is allowed.

Comparing curve 22 with curve 23, the time period between start time $T_0$ of the head movement and start time $T_3$ of the read operation on curve 22 in which the IVC is performed is shorter than the time period between start time $T_0$ of the head movement and start time $T_4$ of the read operation on curve 23 in which the IVC is not performed. In addition, the time period between start time $T_0$ of the head movement and start time $T_7$ of the write operation on curve 22 is shorter than the time period between start time $T_0$ of the head movement and start time $T_8$ of the write operation on curve 23.

In this manner, it has been determined that even if the IVC is performed, the merit of the IVC is not obtained in the write operation in the case that positional deviation L between the start position of the head and the target position is larger than a predetermined distance, while the merit of the IVC is obtained in the remaining three cases, and the above predetermined distance is the length which is equal to or larger than distance L1, which is the distance for switching the control mode from the seek mode to the settling mode in the hard disk drive device.

Figure 7:
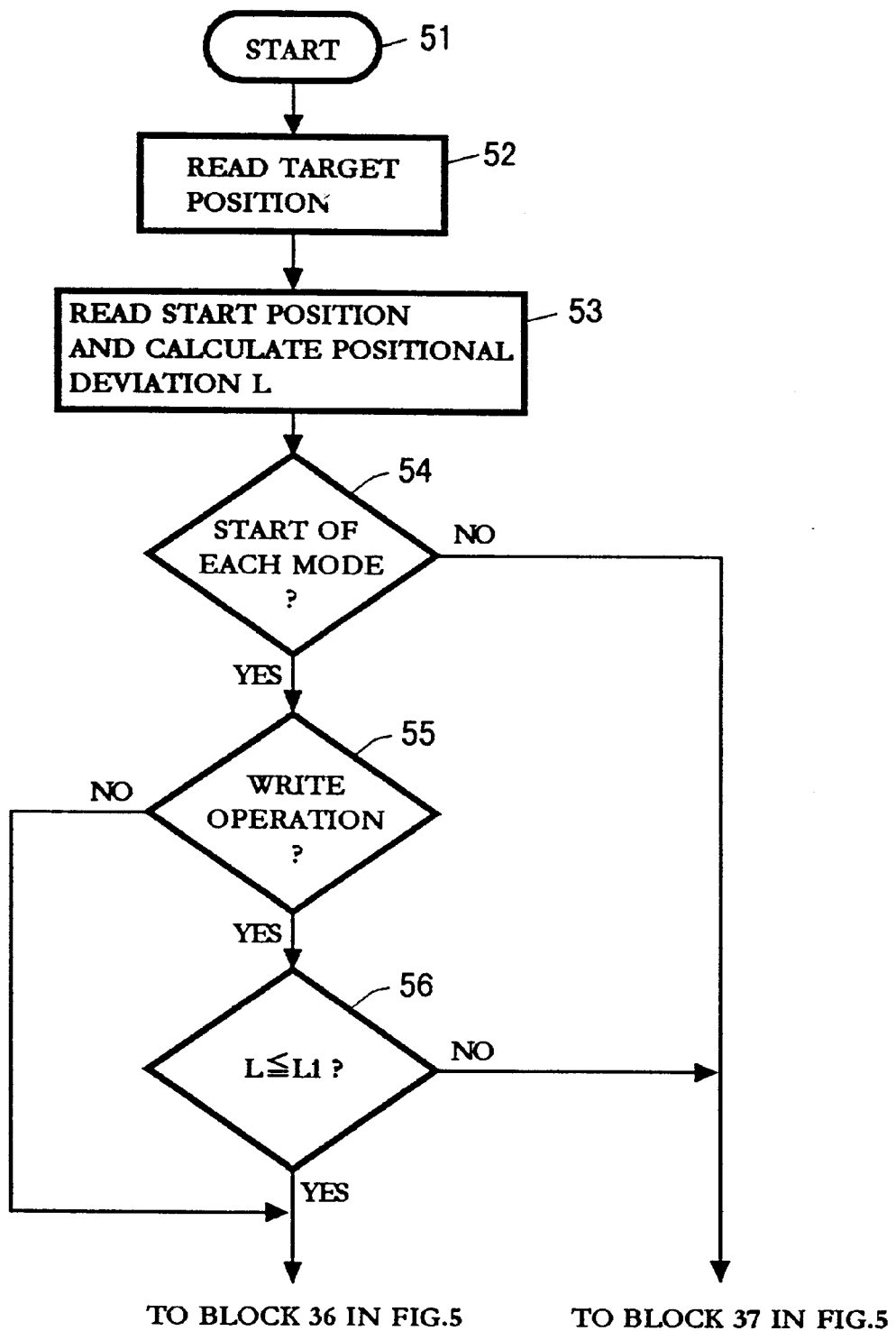
FIG. 7 depicts a high level logic flowchart of the operation of the second embodiment of the present invention.

Referring now to FIG. 7, there is depicted a high level logic flowchart of the operation of the second embodiment of the present invention. As illustrated, the process starts at block 51 and thereafter proceeds to block 52. Block 52 depicts reading the target position. In particular, position/speed control device 10 receives the target position from main control device 1 to store the target position. Next, block 53 illustrates reading the start position and calculating positional deviation L. In particular, position/speed control device 10 reads the start position of the head, and calculates a positional deviation L(the start position—the target position) to store the positional deviation. Next, the process passes to block 54.

Block 54 depicts a determination as to whether or not the current time is the switching time or start time of each mode. If the current time is not the start time of a mode, then the process passes to block 37 of FIG. 5. If the current time is the start time of a mode, then the process passes to block 55. Block 55 illustrates a determination as to whether or not a write operation is the operation being started. If the write operation is not the operation being started, the process passes to block 36 of FIG. 5, in which the read operation utilizing the IVC is performed. In this case, a matrix $K_R$ is utilized as the matrix K for the IVC, and position/speed control device 10 reads a vector $k'_R = k \cdot K_R$ from memory 9, and performs the IVC by utilizing this value $k'_R$.

At block 55, if the write operation is the operation being started, the process passes to block 56. Block 56 depicts a determination as to whether or not the positional deviation L is equal to or less than the predetermined distance (L1). If the positional deviation L is not equal to or less than the predetermined distance (L1), then the process passes to block 37 of FIG. 5, in which position/speed control device 10 performs the write operation without performing the IVC. If the positional deviation L is equal to or less than the predetermined distance (L1), then the process passes to block 36 of FIG. 5. In this case, the matrix $K_W$ is utilized as the matrix K for the IVC, and position/control device 10 reads the vector $k'_W = k \cdot K_W$ from memory 9 and performs the IVC by utilizing this value $k'_W$. The inclination of the curve (the trace of the head) of the IVC utilizing the vector $k'_R = k \cdot K_R$ is larger than the inclination of the curve (the trace of the head) of the IVC utilizing the vector $k'_W = k \cdot K_W$, whereby the period from the time $T_0$ to the start time of the read operation is shortened in comparison with the write operation.

Operation of a Third Embodiment of the Invention

Figure 8:
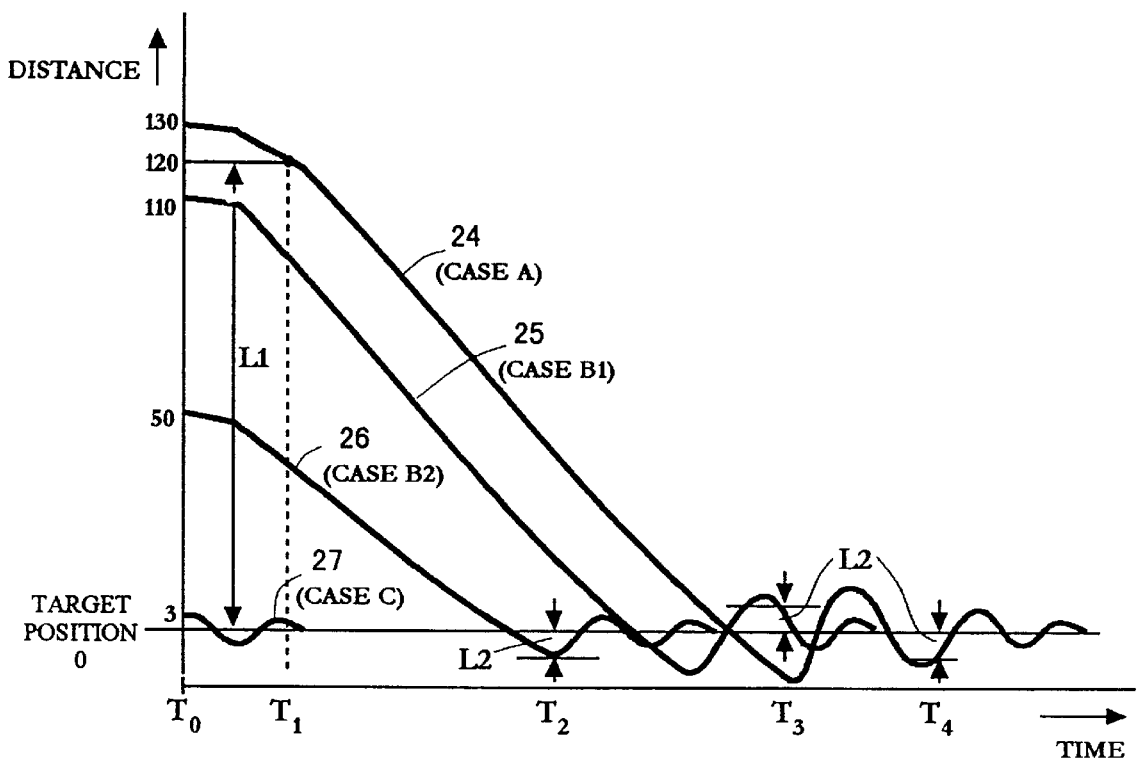
FIG. 8 illustrates a timing diagram of the traces of the head in the third embodiment of the present invention.

With reference now to FIG. 8, there is illustrated a timing diagram of the traces of the head in the third embodiment of the present invention. In the third embodiment, position/speed control circuit 10 detects the distance between the start position and the target position, i.e. positional deviation L, at the start of the positioning operation, i.e. the start of the read operation or the write operation, and reads a set of values of matrices K corresponding to positional deviation L from the memory. The operational mode to be utilized is selected in accordance with the positional deviation. At the start of the write operation or the read operation and/or the switch of the operation mode during the positioning period, position/speed control device 10 calculates the new value $Xc(0)' = KXp(0)$ of equation (3) by utilizing one or a set of values of matrices K which are read from the memory to perform the IVC.

The reason for performing the IVC at the switch of each operation mode is described. The operational characteristic of position/speed control device 10 varies depending upon the operation mode, and the capability for performing acceleration or deceleration varies. Also, since the point of time for switching the operation mode is determined by distances L1 and L2, the distance to the target position varies depending upon the mode. The effect of the IVC for all the cases can be an optimum value by changing the value of matrix K depending upon the target position in each operation mode.

In the third embodiment, the values of K for the cases A, B1, B2 and C are stored in memory 9 in advance. However, the relationship $k' = k \cdot K$ exists, wherein k is the coefficient of position/speed control device 10, and this coefficient is determined depending upon which operation mode, i.e. the seek mode, the settling mode or the following mode, is being performed by position/speed control device 10. Accordingly, in the case that the third embodiment is combined with the first embodiment, the vector $k' = k \cdot K$ is stored in memory 9.

This combination method can also be applicable also to the following embodiments four, five and six.

In the third embodiment, the control operations or the operation for positioning the head by position/speed control device 10 are classified into the following four cases depending upon the value of positional deviation L between the start position of the head and the target position of the head. The values of K for the cases A, B1, B2 and C are stored in memory 9.

Case A

The control operation of case A is performed in the case of L>L1. As described before, distance L1, for example the distance corresponding to the 120 tracks, is the distance for switching the operation mode from the seek mode to the settling mode, and distance L2, for example the distance corresponding to the 4 tracks, is the distance for switching the operation mode from the settling mode to the following mode. In addition, the values of the matrices K depicted at a table 1, for the IVC of the seek mode, the settling mode and the following mode are stored in memory 9. It is noted that SEEK represents the seek, SETT represents the settling, and FOLLOW represents the following.

TABLE 1

| Seek mode | Settling mode | Following mode |
|---|---|---|
| $K_{ASEEK}$ | $K_{ASETT}$ | $K_{AFOLLOW}$ |

Case B1

The control operation of case B1 is performed in the case that L1≧L≧the distance corresponding to 60 tracks. The values of the matrices K, depicted at a Table 2, for the IVC of the settling mode and the following mode are stored in memory 9.

TABLE 2

| Settling mode | Following mode |
|---|---|
| $K_{B1SETT}$ | $K_{B1FOLLOW}$ |

Case B2

The control operation of case B2 is performed in the case that 59≧L>the distance corresponding to 5 tracks. The values of the matrices K, illustrated at a Table 3, for the IVC of the settling mode and the following mode are stored in memory 9.

TABLE 3

| Settling mode | Following mode |
|---|---|
| $K_{B2SETT}$ | $K_{B2FOLLOW}$ |

Case C

The control operation of case C is performed in the case that 4≧L>the distance corresponding to 1 tracks. The values of the matrices K, depicted at a Table 4, for the IVC of the following mode are stored in memory 9.

TABLE 4

| Following mode |
|---|
| $K_{CFOLLOW}$ |

The operation of position/speed control device 10 for fetching the above matrices K from memory 9 at the start of the positioning operation is described with reference to FIGS. 8 and 9.

Figure 9:
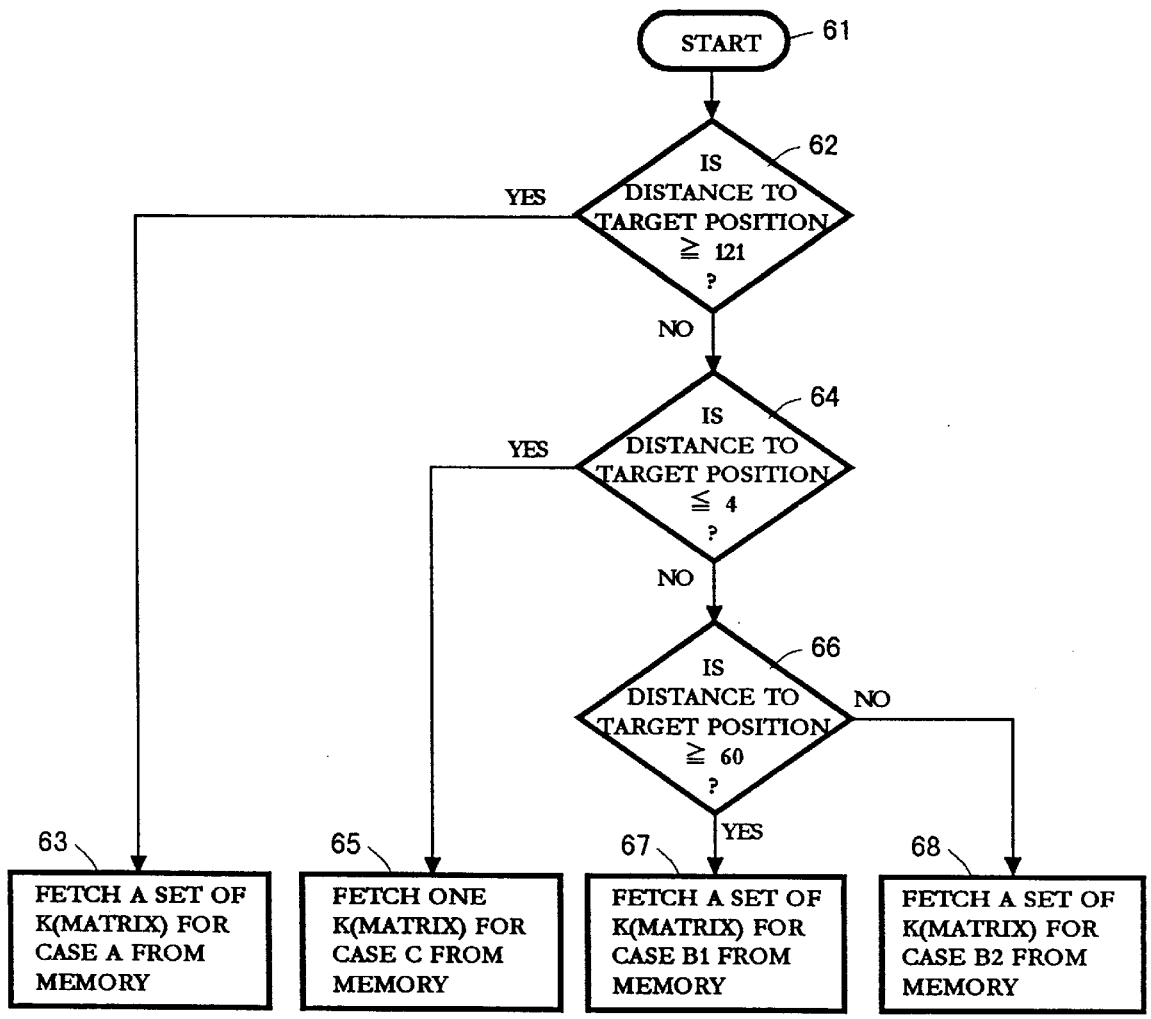
FIG. 9 depicts a high level logic flowchart of the operation of the third embodiment of the present invention.

Referring now to FIG. 9, there is depicted a high level logic flowchart of the operation of the third embodiment of the present invention. As illustrated, the process starts at block 61 and thereafter proceeds to block 62. Block 62 depicts a determination as to whether or not positional deviation L or the distance between the start position and the target position is equal to or greater than the value 121. If positional deviation L is equal to or greater than the value 121, the process passes to block 63. Block 63 illustrates fetching a set of K matrices for case A from memory. The values of these matrices are utilized in the IVC operation performed at the switching times $T_0$, $T_1$ and $T_4$ of the operation mode on the curve 24 of FIG. 8 by position/speed control device 10.

At block 62, if positional deviation L is not equal to or greater than the value 121, the process passes to block 64. Block 64 depicts a determination as to whether or not positional deviation L is equal to or less than the value 4. If positional deviation L is equal to or less than the value 4, then the process passes to block 65. Block 65 illustrates fetching one K matrix for Case C, as described above, from memory. The value of the matrix is utilized in the IVC operation performed at the switching time $T_0$ of the operation mode on curve 27 in FIG. 8 by position/speed control device 10.

At block 64, if positional deviation L is not equal to or less than the value 4, then the process passes to block 66. Block 66 depicts a determination as to whether or not positional deviation L is equal to or greater than the value 60. If positional deviation L is equal to or greater than the value 60, then the process passes to block 67. Block 67 illustrates fetching a set of K matrices for Case B1 from memory. The values of the matrices are utilized in the IVC operation performed at the switching times $T_0$ and $T_3$ of the operation mode on curve 25 in FIG. 8 by position/speed control device 10. If positional deviation L is not equal to or greater than the value 60, then the process passes to block 68. Block 68 depicts fetching a set of K matrices for Case B2 from memory. The values of the matrices are utilized in the IVC operation performed at the switching times $T_0$ and $T_2$ of the operation mode on curve 26 in FIG. 8 by position/speed control device 10.

It is noted that the value of Xp(0)=Xc(0) at the time $T_0$ is represented by equation (9), previously described, and the values at the time $T_0$ are, as follows. The y(0) is the current position of the head, the y(−1) is the position of the head at the sampling time (−1) or the deviated position of the head from the center of the track when the head is positioned on the track, and the outputs U(−1) and U(−2) are substantially equal to "0".

Operation of a Fourth Embodiment of the Invention

Figure 10:
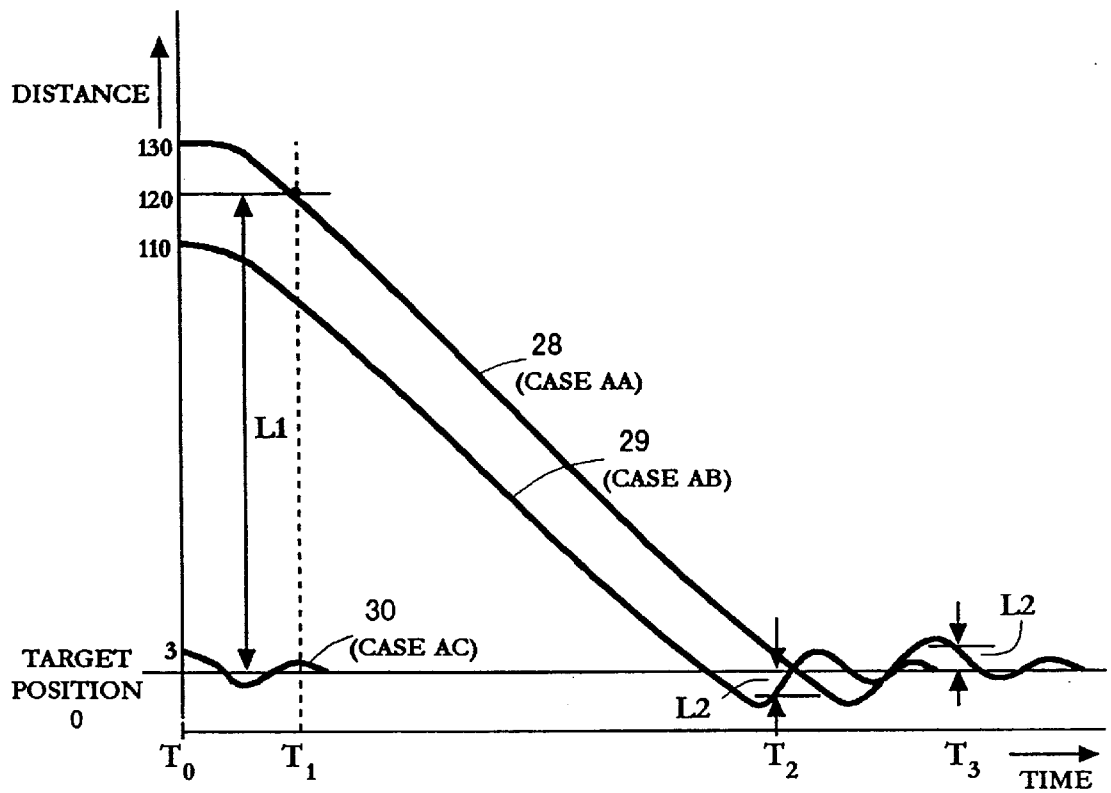
FIG. 10 illustrates a timing diagram of the traces of the head in the fourth embodiment of the present invention.

Referring now to FIG. 10, there is illustrated a timing diagram of the traces of the head in the fourth embodiment of the present invention. In the fourth embodiment, position/speed control device 10 performs the IVC only at the start of the movement of the head. Position/speed control device 10 detects positional deviation L or the distance between the start position and the target position at the start of the read operation or the write operation, and reads the value of one matrix K corresponding to positional deviation L from the memory. In addition, position/speed control device 10 calculates the new value Xc(0)'=KXp(0) of equation (3) by utilizing the value of one matrix K which is read from the memory at the start of the read operation or the write operation to perform the IVC.

It is possible to change the inclination of the trace of the head by changing the value of matrix K. The shapes of the traces determined by utilizing one matrix K are same as each other irrespective of the distance to the target position. But, a small difference could be generated since the switching of the operation modes is performed at distances L1 and L2. In the case that a difference between the current or start position, i.e. the position from which the head is moved, and the target position is small, then the moving distance of the head exceeding the target position, is small, and it is not a problem. In the case that the difference between the position from which the head is moved and the target position is large, the value of the overshoot exceeds the maximum permissible value since this distance is proportional to the difference between the position from which the head is moved and the target position. In other words, it becomes impossible to realize the merit of the IVC which shortens the positioning time period even if the IVC is made in the case that the difference between the position from which the head is moved and the target position is large. However, in the case that the value of the matrix K is selected or determined to realize the merit of the IVC when the difference between the position from which the head is moved and the target position is large, the merit of the IVC can not be realized when the difference between the position from which the head is moved and the target position is small. In either case that the difference between the position from which the head is moved and the target position is large or small, the fourth embodiment can realize the merit of the IVC which shortens the positioning time period by detecting the difference between the position from which the head is moved and the target position, and selecting the value of the matrix K corresponding to the detected distance.

In the fourth embodiment, the control operations of position/speed control device 10 are classified into the following three cases based upon the value of positional deviation L between the start position of the head and the target position. The following values of matrices K are preferably stored in memory 9.

| | Positional Deviation | Values of the matrix K |
|---|---|---|
| Case AA: | L > L1 | $K_{N1}$ |
| Case AB: | L1 ≧ L ≧ Distance corresponding to 5 tracks | $K_{N2}$ |
| Case AC: | 4 ≧ L > Distance corresponding to one track | $K_{N3}$ |

Figure 11:
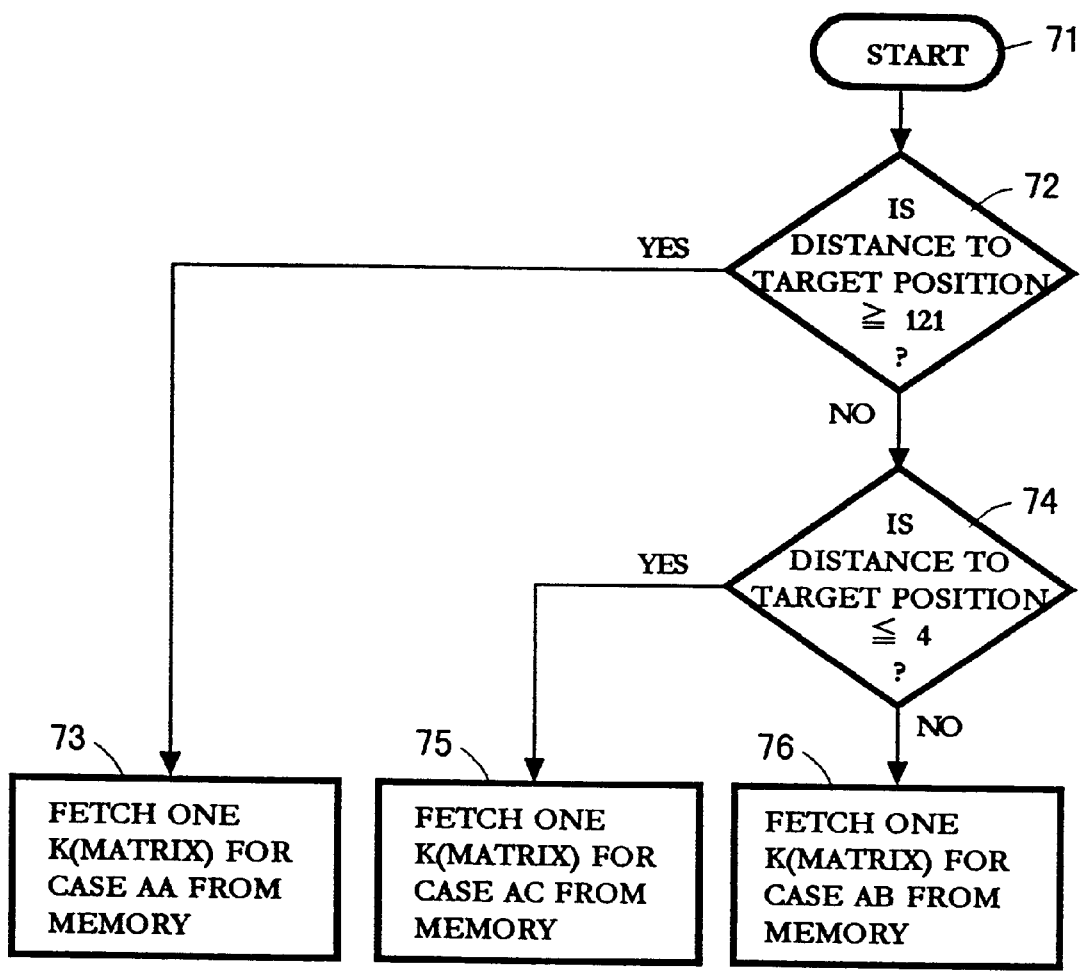
FIG. 11 depicts a high level logic flowchart of the operation of the fourth embodiment of the present invention.

Referring now to FIG. 11, there is depicted a high level logic flowchart of the operation of the fourth embodiment of the present invention. Particular, to the flowchart, distance L1 is selected to the distance corresponding to 120 tracks, and distance L2 is selected to the distance corresponding to the 4 tracks, as described before. As illustrated, the process starts at block 71 and thereafter proceeds to block 72. Block 72 depicts a determination as to whether or not the positional deviation L or the distance between the start position and the target position is greater than or equal to the value 121. If the positional deviation L or the distance between the start position and target position is greater than or equal to the value 121, then the process passes to block 73. Block 73 illustrates fetching one K matrix for case AA from memory. In particular, position/speed control device 10 fetches one matrix $K_{N1}$ for the case AA. The value of the matrix is utilized in the IVC operation performed at the switching time $T_0$ of the operation mode on curve 28 of FIG. 10 by position/speed control device 10.

At block 72, if the positional deviation L or the distance between the start position and target position is not greater than or equal to the value 121, then the process passes to block 74. Block 74 depicts a determination as to whether or not the positional deviation L or the distance between the start position and target position is less than or equal to the value 4. If the positional deviation L or the distance between the start position and target position is less than or equal to the value 4, then the process passes to block 75. If the positional deviation L or the distance between the start position and target position is not less than or equal to the value 4, then the process passes to block 76. Block 75 illustrates fetching one K matrix for case AC from memory. In particular, position/speed control device 10 fetches matrix $K_{N3}$ for the case AC. The value of the matrix is utilized in the IVC operation performed at switching time $T_0$ of the operation mode on curve 30 of FIG. 10 by position/speed control device 10. Block 76 depicts fetching one K matrix for case AB from memory. In particular, position/speed control device 10 fetches one matrix $K_{N2}$ for the case AB. The value of the matrix is utilized in the IVC operation performed at the switching time $T_0$ of the operation mode on curve 29 of FIG. 10 by position/speed control device 10.

It is noted that the value of Xp(0)=Xc(0) at time $T_0$ is represented by equation (9), described before, and the values at time $T_0$ are, as follows. Y(0) is the current position of the head, y(-1) is the position of the head at sampling time (-1) or the deviated position of the head from the center of the track when the head is positioned on the track, and outputs U(-1) and U(-2) are substantially equal to "0".

Operation of a Fifth Embodiment of the Invention

Figure 12:
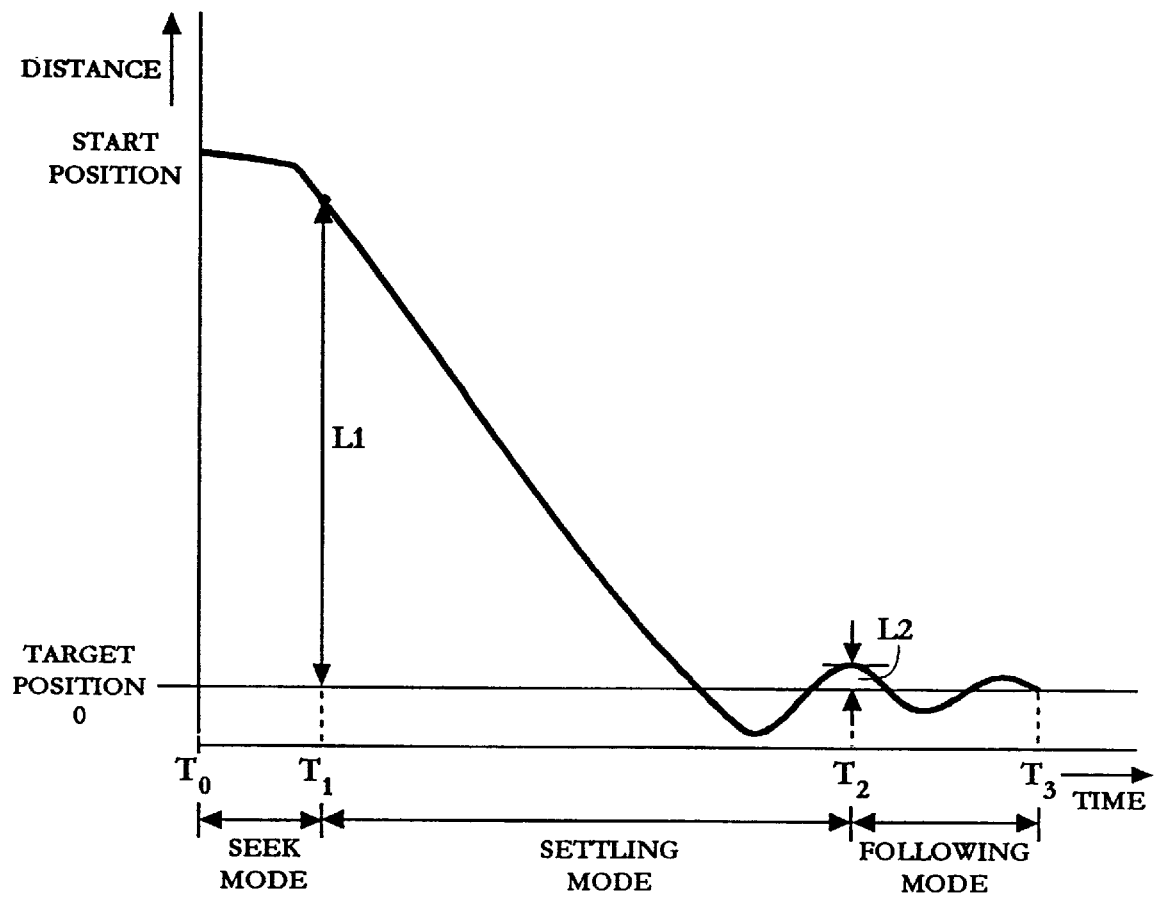
FIG. 12 illustrates a timing diagram of the traces of the head in the fifth embodiment of the present invention.

With reference now to FIG. 12, there is illustrated a timing diagram of the traces of the head in the fifth embodiment of the present invention. In the fifth embodiment, position/speed control device 10, at the switching times of the operation mode, detects which modes are being switched between, detects the moving speed of the head at the switching time of the operation mode, and fetches the value of matrix K stored in memory 9 corresponding to the detected moving speed. In addition, position/speed control device 10 calculates the new value Xc(0)'=KXp(0) of equation (3) by utilizing the value of the matrix K which is read from the memory to perform the IVC. The values of the matrices K, described hereafter, are stored in memory 9. Position/speed control device 10 detects the moving speed of the head based upon the value |y(n)-y(n-1)|.

It is assumed in FIG. 12 that the head is moved from the start position to the target position, and the following two cases "a" and "b" are considered as the examples. In case "a", the moving speed of the head at the switching time $T_1$ of the operation mode is high, and in case "b", the moving speed of the head at the switching time $T_1$ of the operation mode is low. It may happen that the optimum effect or merit of the IVC is not realized in both cases "a" and "b" if the same or common matrix K is utilized for cases "a" and "b". For example, if the value of matrix K is selected to realize the optimum control for case "b", the moving speed of the head is correctly reduced to $\frac{1}{10}$, for example at the switching time in case "b", but the moving speed of the head is not correctly reduced to $\frac{1}{10}$ at the switching time in case "a", so that the overshoot of the head exceeding the target position becomes large, whereby the positioning time can not be shortened. In contradistinction, if the value of matrix K is selected to realize the optimum control for case "a", the moving speed of the head is correctly reduced to $\frac{1}{10}$ at the switching time in case "a", but the moving speed of the head is reduced to a value which is smaller than the value $\frac{1}{10}$ at the switching time in case "b", so that the positioning time of the head becomes long.

In order to solve these case problems, in the fifth embodiment, the control operations of position/speed control device 10 are classified into the following four cases based upon the value of positional deviation L between the start position of the head and the target position.

| Head speed (the number of tracks/$T_S$) at the switching time from the seek mode to the settling mode: | Values of K |
|---|---|
| 0–10: | $K_{M1}$ |
| Equal to or larger than 11: | $K_{M2}$ |

| Head speed (the number of tracks/$T_S$) at the switching time from the settling mode to the following mode: | Value of K |
|---|---|
| 0–10: | $K_{M3}$ |
| Equal to or larger than 11: | $K_{M4}$ |

Wherein $T_S$ represents the time period between adjacent two sampling times.

When position/speed control device 10 detects at time $T_1$ that the distance between the position of the head and the target position becomes equal to distance L1, position/speed control device 10 recognizes the switching from the seek mode to the settling mode, and detects the moving speed of the head at this switching time. If the moving speed of the head falls within the range 0–10 (the number of tracks/$T_S$), position/speed control device 10 fetches matrix $K_{M1}$ from memory 9, and position/speed control device 10 calculates the new value Xc(0)'=KXp(0) of equation (3) by utilizing the value of matrix $K_{M1}$ which is read from the memory to perform the IVC. If the moving speed of the head is equal to or larger than 11 (the number of tracks/$T_S$), position/speed control device 10 fetches the matrix $K_{M2}$ from memory 9, and position/speed control device 10 perform the IVC in the manner as described.

When position/speed control device 10 detects at time $T_2$ that the distance between the position of the head and the target position becomes equal to distance L2, position/speed control device 10 recognizes the switching from the settling mode to the following mode, and detects the moving speed of the head at this switching time. If the moving speed of the head falls within the range 0–10 (the number of tracks/$T_S$), position/speed control device 10 fetches matrix $K_{M3}$ from memory 9, and position/speed control device 10 calculates the new value Xc(0)'=KXp(0) of equation (3) by utilizing the value of matrix $K_{M3}$ which is read from the memory to perform the IVC. If the moving speed of the head at the switching time is equal to or larger than 11 (the number of tracks/$T_S$), position/speed control device 10 fetches matrix $K_{M4}$ from memory 9, and position/speed control device 10 perform the IVC in the manner as described.

Operation of a Sixth Embodiment of the Invention

Figure 13:
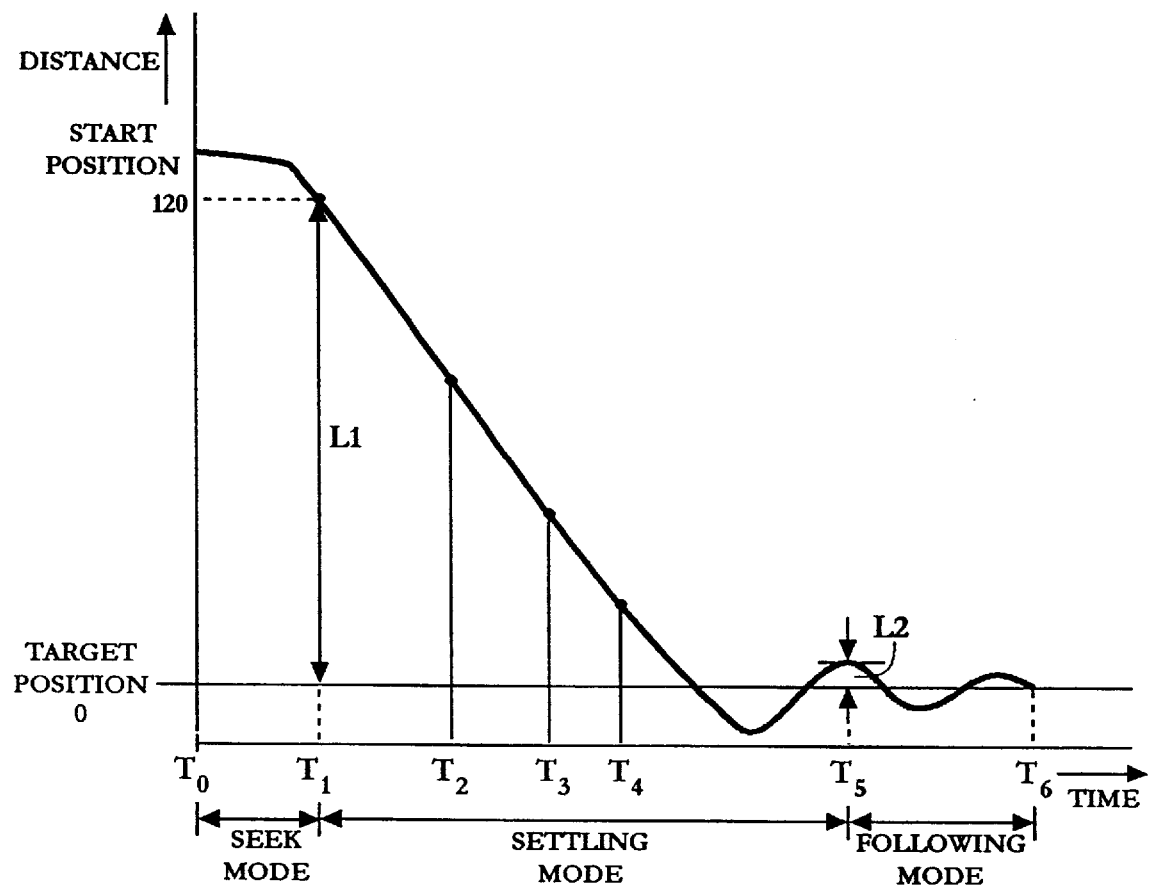
FIG. 13 depicts a timing diagram of the traces of the head in the sixth embodiment of the present invention.

Referring now to FIG. 13, there is depicted a timing diagram of the traces of the head in the sixth embodiment of the present invention. Before describing the operation of the sixth embodiment, a problem solved by the sixth embodiment is described. In the settling mode, the head is rapidly accelerated based upon the IVC performed at time $T_1$ in FIG. 13. The acceleration current signal applied to voice coil motor 3 is the rapidly risen pulse like signal with a large amplitude. This acceleration current pulse signal includes the high frequency components, and due to this high frequency components, the mechanical system, i.e. voice coil motor 3, arm 4 and the read/write head supported on arm 4, vibrates around the center of the target track in a direction parallel to the surface of the disk. The positioning period of the head is extended over the designed value due to the undesired mechanical vibration, whereby the effect of the IVC is decreased.

It has been determined that the mechanical vibration generated due to the large amplitude acceleration current pulse signal applied when positional deviation L or the difference between the start position and the target position is smaller than the distance corresponding to 50–120 tracks exerts a bad influence on the positioning operation of the head. In addition, it has been determined that this bad influence generated when the head is positioned in the above distance can be remarkably decreased by applying an acceleration current pulse with an amplitude which is smaller than the large amplitude of the above prior signal to voice coil motor 3 at the start of the settling mode and one point of time during the settling mode.

The operation of the sixth embodiment is described with reference to FIG. 13. Position/speed control device 10 starts the read operation or the write operation at time $T_0$, switches the operation mode from the seek mode to the settling mode at the time $T_1$, and fetches a first value $K_{P1}$ for the IVC from memory 9. Position/speed control device 10 performs the IVC by utilizing this value $K_{P1}$ and applies a first acceleration current pulse to voice coil motor 3. When position/speed control device 10 detects at time $T_2$ that the distance between the position of the head and the target position becomes equal to the predetermined distance, device 10 reads a second value $K_{P2}$ for the IVC from memory 9. Position/speed control device 10 performs again the IVC by utilizing this value $K_{P2}$ and applies a second acceleration current pulse to voice coil motor 3. The total amplitude of these two acceleration current pulse signals is selected to perform the acceleration operation required in the settling mode. And, position/speed control device 10 applies deceleration current pulse signals to voice coil motor 3 at each of times $T_3$ and $T_4$ during the settling mode. In this manner, the mechanical vibration due to the high frequency components of the acceleration current pulse signal is decreased by applying the deceleration current pulse signals twice. In addition, position/speed control device 10 starts the following mode at time $T_5$.

While the invention has been particularly shown and described with reference to multiple preferred embodiments, it will be understood by those skilled in the art that various changes in form and detail may be made therein without departing from the spirit and scope of the invention.

What is claimed is:

1. A method for controlling the positioning of a read/write head of a data recording device, wherein an initial value compensation method is selectable for determining an control signal for controlling the movement of said read/write head, said method comprising the steps of:
   estimating a plurality of position compensation values and storing said plurality of position compensation values in a memory accessible to a data recording device;
   moving the read/write head from an initial position to a target position utilizing a first control signal;
   sampling a position value of said read/write head during movement;
   computing a position deviation value of said read/write head from said target position for said sampled position value;

selecting a set of said plurality of position compensation values from said memory utilizing said computed position deviation value;

generating a second control signal utilizing an initial value compensation method with said selected set of said plurality of position compensation values;

switching control of said read/write head to said second control signal, wherein continuous smooth control of positioning of said read/write head is achieved in switching from control by a first control signal to a second control signal.

2. The method for controlling the positioning of a read/write head according to claim 1, wherein said step of estimating a plurality of position compensation values and storing said plurality of position compensation values in a memory accessible to a data recording device, further comprises the step of:

storing said plurality of position compensation values as a plurality of matrices.

3. The method for controlling the positioning of a read/write head according to claim 2, said method further comprising the step of:

multiplying a vector of predetermined values with a matrix of predetermined values to achieve a matrix of estimated values of said plurality of matrices, wherein said vector of predetermined values comprises predetermined values associated with a particular positional deviation value, and wherein said matrix of predetermined values comprises predetermined values associated with said initial value compensation method.

4. The method for controlling the positioning of a read/write head according to claim 3, said method further comprising the step of:

determining a plurality of matrices of multiplied vectors and matrices for each of a plurality of position deviation values.

5. The method for controlling the positioning of a read/write head according to claim 1, said method further comprising the step of:

specifying operating modes which comprise operating modes selectable in response to a sampled position deviation value, wherein said operating modes comprise a seek mode, settling mode and following mode.

6. The method for controlling the positioning of a read/write head according to claim 1, said step of selecting a set of said estimated plurality of positioning compensation values from said memory, further comprising the step of:

reading a selected matrix of said estimated plurality of position compensation values, wherein said selected matrix represents a set of estimated position compensation values for utilization by said initial value compensation method, wherein said selected matrix corresponds to said read/write head distanced from said target position by said position deviation value.

7. The method for controlling the positioning of a read/write head according to claim 1, wherein said step of generating a second control signal, further comprises the step of:

determining a control signal from an equation:

$$U(0)=k1'y(0)+k2'(y(0)-y(-1))+k3'U(-1)+k4'U(-2),$$

wherein U(0) comprises said control signal at current time t=0, wherein (k1', k2', k3', k4') comprise said set of said estimated plurality of position compensation values, wherein U(−1) comprises a control signal at previous sampled time t=−1, wherein U(−2) comprises an control signal at previous sampled time t=−2, wherein y(0) comprises a position value of said read/write head at current time t=0, and wherein y(−1) comprises a position value of said read/write head at a previous sampled time t=−1.

8. The method for controlling the positioning of a read/write head according to claim 7, said method further comprising the step of:

determining a value for U(−1)' utilizing an equation:

$$U(-1)'=c1y(0)+c2\,(y(0)-y(-1)+c3U(-1)+c4U(-2),$$

wherein c1, c2, c3 and c4 comprise predetermined constant values stored in said memory, wherein U(−1) comprises a control signal at previous sampled time t=−1, wherein U(−2) comprises control signal at previous sampled time t=−2, wherein y(0) comprises a position value of said read/write head at current time t=0, and wherein y(−1) comprises a position value of said read/write head at a previous sampled time t=−1.

9. The method for controlling the positioning of a read/write head according to claim 8, said method further comprising the step of:

determining U(−1)' after switching to said second control signal, wherein U(−1)' becomes available for determining a control signal U(1) at a future time t=+1.

10. The method for controlling the positioning of a read/write head according to claim 1, wherein said step of sampling a position value of said read/write head during movement, further comprises the step of:

continuing to sample said position value of said read/write head at a periodic rate during movement until a read or write operation at said target position has been completed, such that control signals are generated for each sampled position value.

11. The method for controlling the positioning of a read/write head according to claim 1, said method further comprising the step of:

generating a second output signal by an alternate method, in response to not selecting said initial value compensation method.

12. The method for controlling the positioning of a read/write head according to claim 1, said method further comprising the steps of:

determining if a seek operation for initially starting movement of said read/write head is initiated;

reading a target position for said read/write head, in response to determining that said seek operation for initially starting movement of said read/write head is initiated;

sampling a current position value;

calculating a position deviation value from said current position value to said target position; and generating a first control signal.

13. The method for controlling the positioning of a read/write head according to claim 1, wherein said step of selecting a set of said plurality of positioning compensation values from said memory, further comprises the steps of:

determining if a distance L represented by said position deviation value is longer than a predetermined distance L1 or a predetermined distance L2, where predetermined distance L2 is shorter than said distance L1;

selecting a position compensation value estimated for said initial value compensation of a seek mode, a position compensation value estimated for said initial value compensation of a settling mode and a position compensation value estimated for said initial value compensation of a following mode from said memory, in response to determining that said distance L is longer than said predetermined distance L1;

starting said seek mode after performing said initial value compensation to generate a first control signal at said start of said seek mode;

starting said settling mode after performing said initial value compensation to generate a second control signal, in response to detecting that a distance between a position of said read/write head and said target recording position is equal to said predetermined distance L1; and starting said following mode after performing said initial value compensation to generate a third control signal, in response to detecting that a distance between a position of said read/write head and said target recording position is equal to said predetermined distance L2.

14. The method for controlling the positioning of a read/write head according to claim 13, said method further comprising the steps of:

selecting a position compensation value estimated for said initial value compensation of said settling mode and a position compensation value estimated for said initial value compensation of said following mode from said memory, in response to determining that said distance L is shorter than said predetermined distance L1 and longer than said predetermined distance L2;

starting said settling mode after performing said initial value compensation to generate a first control signal at the start of said settling mode; and starting said following mode after performing said initial value compensation to generate a second control signal, in response to detecting that a distance between a position of said read/write head and said target recording position is equal to said predetermined distance L2.

15. The method for controlling the positioning of a read/write head according to claim 13, said method further comprising the steps of:

selecting an position compensation value estimated for said initial value compensation of said following mode from said memory, in response to determining that said distance L is shorter than said predetermined distance L2; and starting said following mode after performing said initial value compensation to generate a first control signal.

16. The method for controlling the positioning of a read/write head according to claim 1, wherein said step of selecting a set of said plurality of positioning compensation values from said memory, further comprises the steps of:

determining whether said distance L which is represented by said position deviation value is longer than a predetermined distance L1 or a predetermined distance L2 which is shorter than said distance L1;

starting said seek mode, in response to determining that said distance L is longer than said predetermined distance L1;

detecting a moving speed of said read/write head when a distance between a position of said read/write head and said target recording position is equal to said distance L1;

selecting a position compensation value for said initial value compensation which corresponds to said detected moving speed;

performing said initial value compensation by utilizing said selected position compensation value; and starting said settling mode.

17. The method for controlling the positioning of a read/write head according to claim 16, said method further comprising the steps of:

detecting a moving speed of said read/write head when a distance between said read/write head and said target recording position is equal to said distance L2;

selecting a position compensation value for said initial value compensation which corresponds to said detected moving speed from said memory;

performing said initial value compensation by utilizing said selected position compensation value; and starting said following mode.

18. A data recording device, said data recording device comprising:

a data recording medium comprising a plurality of recording positions;

a head positioning element that moves a read/write head from a start position to a target recording position on said data recording medium; and a control element that supplies control signals to said head positioning element and utilizes a first control signal to start movement of said read/write head of said data recording device from an initial position to a target position;

an estimation element that estimates a plurality of position compensation values for utilization with an initial value compensation method and stores said plurality of position compensation values in a memory accessible to a data recording device;

a position sampling element that samples a position value of said read/write head during movement;

a computation element that computes a position deviation value of said read/write head from said target position to said sampled position value;

a selection element that selects a set of said plurality of positioning compensation values from said memory, in response to said calculation of said positional deviation; and a compensation element that determines a second output signal by said initial value compensation method utilizing said selected set of said plurality of position compensation values, said calculated position deviation value, and said first control signal value;

wherein said control element thereafter switches to said second control signal for controlling the movement of said read/write head, wherein continuous smooth control of positioning of said read/write head is achieved in switching from control by a first output signal to a second output signal.

19. The data recording device of according to claim 18, wherein said estimation element further comprises:

a storage device for storing said plurality of position compensation values as a plurality of matrices.

20. The data recording device of according to claim 18, said device further comprising:

a specification element that specifies an operating mode selection from among a seek mode, settling mode and following mode, in response to a sampled position deviation value.

* * * * *